(Model.) 3 Sheets—Sheet 1.

W. LAUHOFF.
ALARM FOR MILLSTONES.

No. 253,873. Patented Feb. 21, 1882.

WITNESSES.
Samuel E. Thomas
Herbert Burnham

INVENTOR.
William Lauhoff
By Wells W. Leggett ATTORNEY.

(Model.) 3 Sheets—Sheet 2.

W. LAUHOFF.
ALARM FOR MILLSTONES.

No. 253,873. Patented Feb. 21, 1882.

WITNESSES.
Samuel E. Thomas.
Geo. N. Chase.

INVENTOR.
William Lauhoff
By Wells W. Leggett.
ATTORNEY.

(Model.)

3 Sheets—Sheet 3.

W. LAUHOFF.
ALARM FOR MILLSTONES.

No. 253,873. Patented Feb. 21, 1882.

WITNESSES.
Samuel E. Thomas.
Geo. N. Chase

INVENTOR.
William Lauhoff
By Will. W. Leggett
ATTORNEY.

UNITED STATES PATENT OFFICE.

WILLIAM LAUHOFF, OF DETROIT, MICHIGAN.

ALARM FOR MILLSTONES.

SPECIFICATION forming part of Letters Patent No. 253,873, dated February 21, 1882.

Application filed September 30, 1880. (Model.)

*To all whom it may concern:*

Be it known that I, WILLIAM LAUHOFF, of Detroit, county of Wayne, State of Michigan, have invented a new and useful Improvement in Alarms for Millstones; and I declare the following to be a full, clear, and exact description of the same, such as will enable others skilled in the art to which it pertains to make and use it, reference being had to the accompanying drawings, which form a part of this specification.

My invention relates to mechanism for sounding an alarm when the grain in the hopper shall have nearly expended itself, so that a timely warning may be given to the miller before the grinding-stones cease to be supplied with grain.

Figure 1:
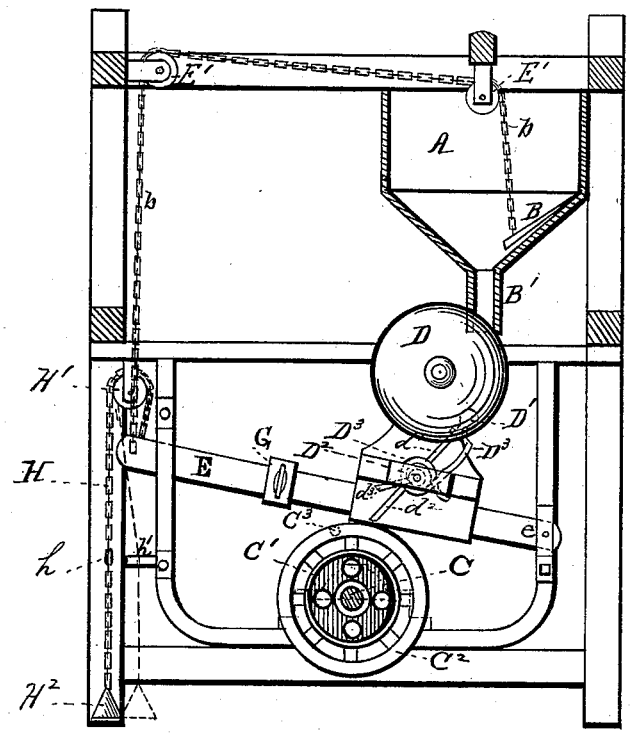
Figure 2:
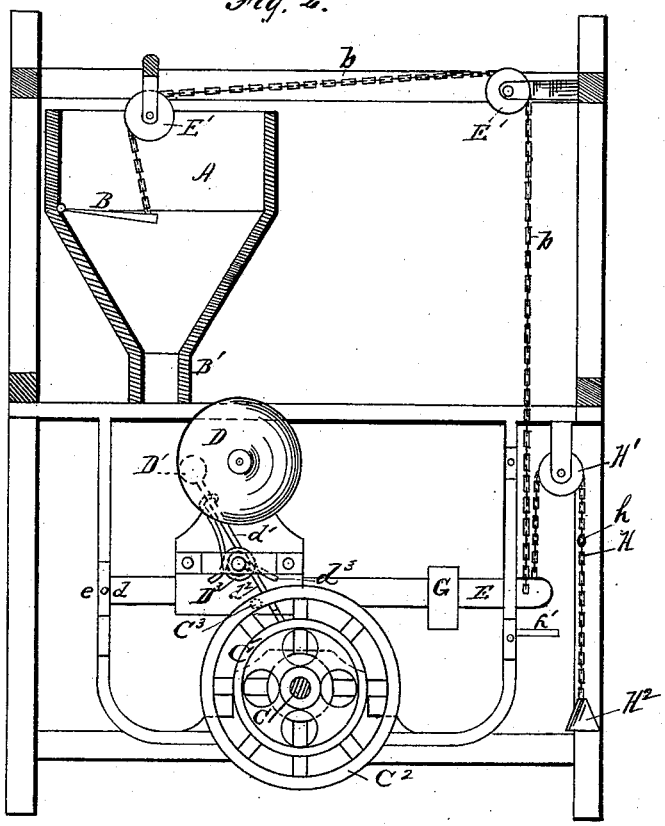
Figure 3:
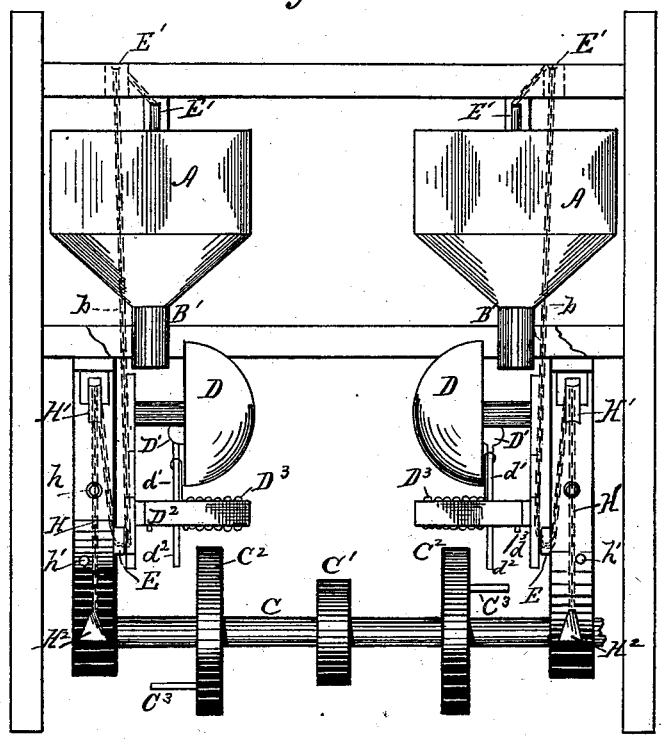

In the drawings, Figure 1 is a view partly in section and partly in elevation illustrating my invention with the valve or wing held down by the grain in the hopper, whereby the signal mechanism is held out of gear. Fig. 2 is a similar view with the valve or wing in the hopper resting at its highest point, so as to throw the signal mechanism into gear. Fig. 3 is a front elevation.

In grinding-mills it is well known that when the stones are in motion without a layer of grain between them they grind upon each other, thus rapidly destroying the dress of the stones and creating so much damage in a few moments as to necessitate the removal and redressing of the stones. This difficulty is especially met with in custom mills, where a limited amount of grain is thrown into the hopper to be fed therefrom and ground. The miller is therefore obliged to keep constant watch of the hopper to ascertain when the grain is nearly exhausted, so that he may stop the run of the stones before they run dry of grain.

It is the object of this invention to overcome this difficulty and give a signal to the miller which shall indicate that the corresponding hopper is nearly exhausted of its grain.

To this end A represents a hopper.

B is a wing or valve located within the hopper and suitably hinged or otherwise attached thereto, as shown.

B' is the spout of the hopper, from which the grain is led away to one or more sets of millstones or grinders.

C is a shaft provided with suitable gears, C', whereby the shaft is kept in motion at all times while the stones are running. This shaft C is provided at suitable intervals with wheels $C^2$, bearing arms $C^3$, which serve as trips for sounding the alarm, though instead of being in the form of wheels with arms there may be simply arms attached directly to the shaft and adapted to trip and sound the alarm in like manner.

D is a suitable bell or gong with a clapper, D', attached at the end of an arm, d', which projects from the shaft $D^2$, which is journaled in a suitable bracket near the gong in the usual manner, and another arm, $d^2$, projects from the shaft $D^2$ down contiguous to the trip. A spring, $D^3$, coiled around the shaft and having one end projecting under the bracket or any other suitable stop, while the other end is bent loosely around the clapper-arm, serves to force the clapper nearly against the gong, the clapper being prevented from striking the gong by means of a small arm or stop, $d^3$, which projects from the shaft $D^2$ and impinges at the proper instant against the frame. The spring is prevented from turning upon the shaft, so that when the spring is thrown back by the action of the trip it will by its retraction force the clapper back against the gong as soon as the trip has passed.

E is a lever, pivoted at e, to which the gong is attached. From the free end of this lever a chain or cord, b, passes over suitable pulleys, E', and is attached at its other end to the free extremity of the valve or wing B in the hopper.

The operation of the device will now be understood. The hopper being filled with grain, the weight of the grain holds the wing or valve B down in its lowest position. When in this position it draws upon the chain and holds the lever E in its highest position, as shown in Fig. 1, in which position the signal mechanism has been lifted so high as to be out of the way of the trip $C^3$. On the lever E, however, is an adjustable weight, G, which may be adjusted so as to counterpoise any desired amount of grain in the hopper. Now, when the grain in the hopper has so far wasted that it will soon cease to supply the stones, this counterpoise-weight G will, by drawing upon the chain, lift the wing or valve B, thus permitting the gong and signal apparatus to drop down into proximity with the trip $C^3$, so that thereafter, at each revolution of the shaft C, the trip or trips $C^3$ will come in contact with the arm $d^2$, forcing the latter back, and as it escapes from the trip the spring will force the clapper against the gong, and thus the signaling will be maintained until stopped by the miller, or until a new quantity of grain is supplied to the hopper.

If desired, a chain, H, may be attached to the end of the lever E, and, passing thence over a pulley, H', may suspend a weight, $H^2$, the object being to form a means of fastening the signal mechanism out of gear, yet of such nature that it will be automatically thrown into gear as soon as the hopper is again supplied with grain. This is accomplished as follows: The wing or valve B is forced down nearly but not quite to its lowest position, the chain H is provided with a ring, $h$, so located that when the wing B is in the position described the ring may, by deflecting the chain H, slip over a stud or pin, $h'$, and will thus hold the signal mechanism out of gear; but as soon as the hopper is supplied with grain the weight of the latter, pressing upon the wing B, will force the wing down to its lowest position, thus slightly lifting the lever E and slackening upon the chain H, when the weight $H^2$ will at once cause the ring $h$ to slip off from the stud and free the signal mechanism, so that when the grain is again nearly wasted the signal mechanism will be thrown into gear with the trips $C^3$.

Of course I do not limit myself to the employment of a hopper for each run of stones, for a single hopper may supply grain to a number of runs of stones, and one signal will therefore answer for all the stones supplied with grain from the corresponding hopper. If there are several hoppers, there should be a corresponding number of signal apparatuses, two being represented in the drawings, and as a matter of convenience the signals should sound differently, so that the miller would soon learn to know where his attention was required simply by the sound of the signal.

The weight G may be so adjusted that it will descend when there is grain enough in the hopper to run, say, three or five minutes longer, or may be adjusted to correspond with any other desired limit of time.

I am aware that a valve or gate arranged in the grain spout or chute leading to the millstones has been connected with an alarm and arranged to trip the same when the supply of grist decreases to a given volume, and I do not claim such construction, broadly.

What I claim is—

1. In a grinding-mill, the combination, with a hopper and a valve or flexible wing located thereon, of a signal mechanism provided with a bell and a bell-hammer having a spring-arm provided with a projecting tripping tail or end, a pivoted lever carrying said signal mechanism, a rotary wheel arranged below said arm or adjacent thereto and having a projection arranged to strike the projecting end of the bell-hammer, an adjustable counterpoise arranged upon said lever, and a flexible connection between the free end of said lever and the valve or wing in the hopper, substantially as described.

2. The combination, with the lever E, chain $b$, and the signal mechanism carried by said lever, of the valve or wing B, chain H, having ring $h$, pin $h'$, and weight $H^2$, substantially as described, and for the purpose set forth.

3. The combination, with the hopper and the valve or wing thereon, of the chain $b$, the pulleys E' E', over which said chain passes, the pivoted lever E, having its free end attached to the lower end of said chain $b$, the signal mechanism mounted on said lever and having a bell and a spring bell-hammer provided with the projecting end $d^2$, the rotary wheel provided with the pin $C^3$, the chain H, connected to the free end of the lever, the pulley H', the ring $h$, inserted in said chain H, the weight $H^2$, and the stationary pin $h'$, all arranged and operating substantially as described, and for the purpose set forth.

In testimony whereof I sign this specification in the presence of two witnesses.

WILLIAM LAUHOFF.

Witnesses:
JOSEPH LAUHOFF,
WILLIAM M. PORTER.